United States Patent

Schreiner et al.

[11] 4,412,705
[45] Nov. 1, 1983

[54] BEARING ASSEMBLY FOR TRANSMISSION OUTPUT SHAFT

[75] Inventors: Friedrich Schreiner, Kehlen; Uwe Staberoh, Friedrichshafen, both of Fed. Rep. of Germany

[73] Assignee: Zahnradfabrik Friedrichshafen Aktiengesellschaft, Friedrichshafen, Fed. Rep. of Germany

[21] Appl. No.: 323,408

[22] Filed: Nov. 20, 1981

[30] Foreign Application Priority Data

Nov. 22, 1980 [DE] Fed. Rep. of Germany ....... 3044050

[51] Int. Cl.³ .............................................. F16C 35/06
[52] U.S. Cl. ................................. 308/178; 308/189 R
[58] Field of Search .................. 308/189 R, DIG. 11, 308/189 A, 135, 198, 207 R, 207 A

[56] References Cited

U.S. PATENT DOCUMENTS

| 2,022,618 | 11/1935 | Church | 308/135 X |
| 2,051,704 | 8/1936 | Harris | 308/DIG. 11 X |
| 2,503,027 | 4/1950 | Christian | 74/421 A |
| 2,812,987 | 11/1957 | Eilmann | 308/189 R X |
| 2,885,583 | 5/1959 | Zunick et al. | 308/189 R X |
| 3,510,184 | 5/1970 | Gruber et al. | 308/189 R |
| 4,112,786 | 9/1978 | Thomas | 74/606 R |
| 4,138,168 | 2/1979 | Herlitzek | 308/189 R |

FOREIGN PATENT DOCUMENTS

| 1575636 | 11/1970 | Fed. Rep. of Germany . |
| 949007 | 2/1964 | United Kingdom . |
| 960852 | 6/1964 | United Kingdom . |
| 1243946 | 8/1971 | United Kingdom . |
| 2010984 | 7/1979 | United Kingdom . |
| 1556880 | 11/1979 | United Kingdom . |
| 2024338 | 1/1980 | United Kingdom . |
| 1573835 | 8/1980 | United Kingdom . |

Primary Examiner—Stuart S. Levy
Assistant Examiner—David Werner
Attorney, Agent, or Firm—Karl F. Ross; Herbert Dubno

[57] ABSTRACT

A bearing assembly for a transmission output shaft carrying gears within the transmission comprises a roller bearing engaging the shaft between two such gears and suspended from the transmission housing on a plate which juxtaposed with a surface of the housing. Another bearing at the end of the housing generally also engages this shaft.

9 Claims, 4 Drawing Figures

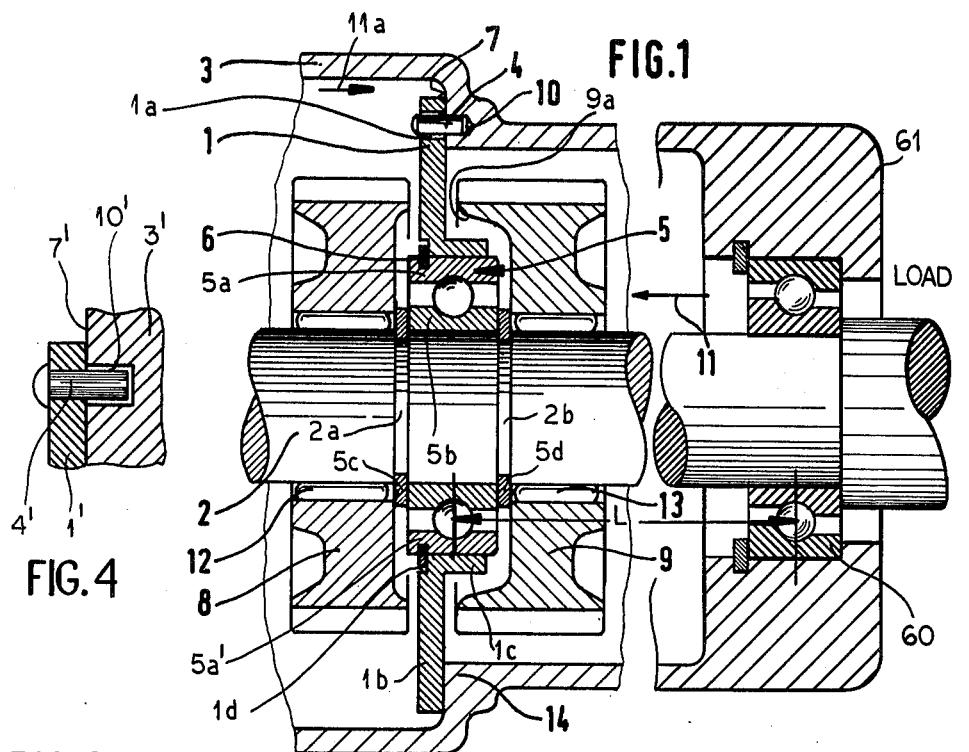
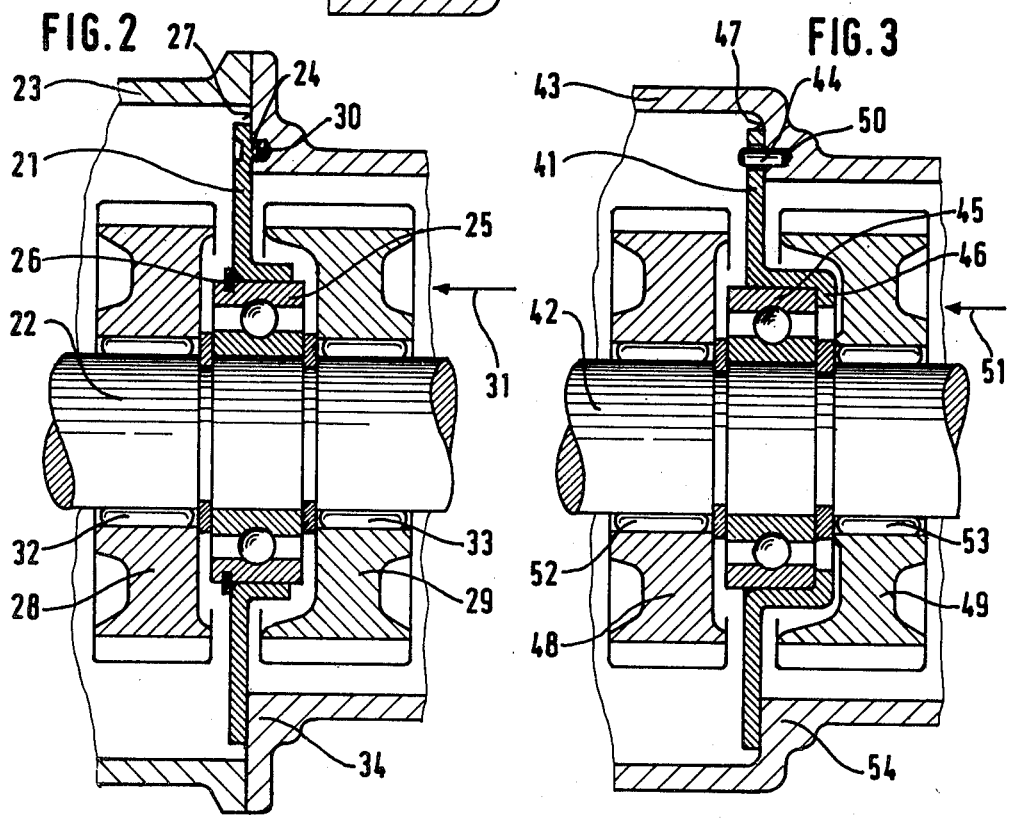

BEARING ASSEMBLY FOR TRANSMISSION OUTPUT SHAFT

FIELD OF THE INVENTION

The present invention relates to a bearing assembly for a transmission output shaft and, more particularly, to a holding device for a shaft bearing located within the transmission housing and generally spaced from the main shaft bearing at the end of the housing, thereby additionally supporting an output shaft or the like which can have a free end terminating within the transmission housing.

BACKGROUND OF THE INVENTION

Motor vehicle and other speed-reducing or speed-increasing transmissions of the mechanical or hydromechanical type generally comprise a transmission housing enclosing, inter alia, means for changing the transmission ratio between an input shaft and an output shaft and gearing forming part of such means or part of the power train which can include gears on the output shaft.

The latter connected to the load externally of the transmission housing is generally journaled in a bearing at the output end of the housing and has a free end terminating within the housing.

In some cases, this output shaft has its free end rotatably mounted via suitable bearings in the free end of the output shaft so that both free ends can be supported.

Obviously, such an arrangement is only effective when the input and output shafts have a common axis.

In modern space-conserving complex transmissions, the input shaft is with increasing frequency disposed parallel to but offset from the axis of the output shaft so that mutual support of the two shafts is not possible.

For journaling this free end of the output shaft, therefore, it is desirable to provide a roller bearing within the transmission housing. This, however, cannot always be done effectively, because, on the one hand, the conventional bearing mounts which have to be machined in or cast unitarily with the housing, cannot readily be accommodated in the available space.

Furthermore, when bearings of the latter type are provided in a transmission, assembly of the transmission is complicated because only gears to one side of the additional bearing can be premounted upon the output shaft before the latter is fitted into the transmission housing, the gears on the opposite side of the bearing being thereafter mounted upon the shaft.

Once the output shaft assembly is fitted to the transmission housing, the assembly of the additional gears thereof in the manner described may be difficult or even impossible without unduly enlarging the transmission housing, complicating the access of the interior thereof or creating sealing problems.

OBJECTS OF THE INVENTION

It is therefore a principal object of the present invention to provide a bearing assembly for the purpose described which can obviate the disadvantages discussed above.

Another object of this invention is to provide a holding device for a bearing which is of low cost, inexpensive to produce and facilitates assembly of the transmission.

SUMMARY OF THE INVENTION

These objects and others which will become apparent hereinafter are attained in accordance with the present invention by providing a holding device or a roller bearing, especially for the output shaft of a transmission, which is in form of a plate receiving the roller bearing and advantageously premounted upon the output shaft between a pair of gears thereof, with the plate extending outwardly beyond these gears and resting against an axially facing surface or stop formed internally of the transmission housing and engaging the latter so as to prevent rotation of the plate.

The holding device, therefore, is a bearing plate received in the housing of the transmission as part of the output shaft assembly and holding a roller bearing for the shaft. The bearing plate and the rolling bearing carried thereby can thus be located between a gear on the output shaft and the free end thereof in the housing.

The terms "roller bearing" or "rolling bearing", as used herein, is intended to refer to any bearing having an inner race mounted upon the shaft, an outer race received in the holding plate and a plurality of rolling elements fitted between the races and rolling with low friction thereon, these rolling elements being either balls, needles, pins, barrel-shaped, frustoconical or cylindrical rollers or any other rolling elements common in the bearing art.

According to a feature of this invention, the bearing plate is fixed within the housing so as to be axially supported against the housing in one direction, preferably the direction opposite that in which the output shaft is fixed by its main bearing at the output end of the transmission housing, the bearing plate being free of engagement by the housing in the opposite direction from that in which it is fixed.

Radial or circumferential forces may be taken off by an axially extending formation on the bearing plate which engages in a complementary formation of the aforementioned surface of the housing, which may be a step integrally formed thereon, a step machined in the housing or a step defined by the attachment of two housing parts together.

According to another feature of the invention, in one axial direction the bearing simply rests against the bearing plate although it may be held there against in the opposite axial direction, e.g. via a holding collar formed unitarily in the bearing plate. The outer race may also be formed with a groove receiving a holding ring which axially immobilizes the bearing relative to the holding plate in one direction.

As previously indicated the transmission housing may be formed from housing parts which are joined substantially at the plane of the bearing and in this case, one of the junction surfaces of the interconnected housing parts may be enlarged to form a surface against which the holding plate rests, this surface being preferably machined.

One of the advantages of the system of the invention is that the plate may be made by stamping or like deformation techniques which need not include any material-removal operations, i.e. without cutting.

As a consequence, the holding plate can be assembled and inexpensively reduced and, once the holding plate and bearing are fitted onto the shaft, the shaft assembly can be inserted as a complete unit into the transmission housing. Since the bearing plate is a preformed stamped unit, no work on it within the transmission housing is required, and it can be held in place simply by inserting the previously mentioned formation into a corresponding recess in the seating surface.

BRIEF DESCRIPTION OF THE DRAWING

The above and other objects, features and advantages of the present invention will become more readily apparent from the following description reference being made to the accompanying drawing in which:

FIG. 1 is a partial section through a transmission with the holding device according to the invention comprising a bolt or pin for absorbing the bearing forces;

FIG. 2 is a partial section similar to that of FIG. 1, but showing a projection shaped out of the material of the holding device for absorbing the bearing forces;

FIG. 3 is a holding device according to FIG. 1, but additionally comprising a holding collar for holding the bearing for the shaft; and FIG. 4 is a detail view showing a modification of the formation utilized in FIG. 1.

SPECIFIC DESCRIPTION

A shaft in a transmission, in particular an output shaft (FIG. 1) is rotably mounted in a main bearing not shown in the drawing and axially fixed in the direction of an arrow 11. Further support in the housing 3 is effected by a bearing 5, onto which is fitted a retaining ring 6, e.g. a spring ring. The bearing ring to the side of the shaft is firmly seated on the output shaft 2. The bearing 5 and thus the output shaft 2 are held by a bearing plate 1 which is supported against a contact surface 7 on a shoulder 14 of the housing 3. The bearing plate 1 is safeguarded against twisting by means of a bolt or pin 4 in a bore 10 in the housing 3.

The retaining ring 6 prevents the output shaft 2 from axially moving contrary to the direction of arrow 11.

To assemble the transmission the output shaft 2 may be fitted into the housing 3 of the transmission as an assembly complete with e.g. gears rotating on bearings 12 or 13, assembled bearing 5 and bearing plate 1 fitted to it. The output shaft 2 is fitted into the housing 3 in such a way that the bolt 4 in the bore 10 of the housing 3 slides through a corresponding bore in the bearing plate 1. On the opposite side the holding plate 1 is supported loosely against the contact surface 7 formed by the shoulder 14.

The bolt 4 may also be firmly fixed to the bearing plate 1 and is, in such a case, pushed into the bore 10 together with the bearing plate 1 during assembly of the output shaft 2.

In the direction of arrow 11 the output shaft 2 is axially fixed by the bearing not shown in the drawing, against the direction of arrow 11 it is axially fixed by the retaining ring 6 on the bearing 5 which is firmly seated on the output shaft 2. The bolt 4 absorbs forces directed vertically to the output shaft 2.

As is also apparent from FIG. 1, the pin 4 can be forefitted into the bore 10 in the surface 7 and can pass with clearance through the hole 1a in the holding plate 1. Thus axial displacement of the holding plate in the direction of arrow 11 is permitted although displacement in the direction of arrow 11a is barred by the engagement of the planar portion 1b of the holding plate within seat 2.

The planar portion 1b terminates along its inner periphery in a cylindrical boss 1c in which the outer race 5a of the ballbearing 5 can be press fitted and held by the ring 6 which can be a split ring snapped into a groove 5a' in the outer race 5a of the bearing. The inner race 5b can be press fitted into the shaft 2 during assembly of the gears 8 and 9 thereof and is held beween split rings 5c and 5d which are received in grooves 2a and 2b of the shaft 2.

The toothed rims of the gears, e.g. as shown in 9a, can overhang the bearing 5 and the boss 1c for increased compactness.

The split ring 6 has a thickness equal to the depth of a recess 1d formed in the holding plates to accommodate this split ring.

To retain the shaft 2 so that it is locked as represented by the arrow 11 against axial movement counter to this arrow, the main bearing 60 in the output end 61 of the housing may be of a combined thrust and radial type.

The bearing basis, referred to below, is represented by L in FIG. 1. It will also be apparent that the pin 4 can be fixed to the plate. This is shown in FIG. 4 where the pin 4' is fixed to the plate 1' and is raised with clearance in the bore 10' of the housing part 3' when the plate rests against the surface 7'.

In another example of a bearing plate 21 (FIG. 2) this has been used to shape a projection 24 out of it which engages in a recess 30 in a shoulder 34 of a housing 23 when the bearing plate is mounted in the housing. In this example also the bearing plate 21 rests against a contact surface 27 of the housing 23, holds a bearing 25 seated firmly on an output shaft 22 and prevents axial movement of the output shaft 22 against the direction of an arrow 31 due to a retaining ring 26, which is fitted onto bearing 25. The output shaft 22 may be fitted into the transmission together with the gears 28, 29 rotating on bearings 32, 33.

Forces vertical to the output shaft 22 are diverted via projection 24 to the housing 23.

In a further example of the invention another bearing plate 41 (FIG. 3) is used which is provided with a holding collar 46 which helps to prevent axial movement of a bearing 45 together with an output shaft 42 against the direction of an arrow 51. The bearing plate 41 is fixed either, similar to the example as per FIG. 1, by means of a bolt 44 and a bore 50 in a housing 43 of the transmission or, similar to the example as per FIG. 2, by means of a projection shaped out of the bearing plate, in order to prevent the output shaft 42 from moving vertically to its longitudinal direction and also to prevent twisting of the bearing plate 41. The latter rests against the housing 43 at a contact surface 47 formed by a shoulder 54. This prevents the bearing plate 41 from moving against the direction of the arrow 51. In the direction of the arrow 51 the bearing plate 41 is loose. In this example also, the output shaft 42 may be fitted into the housing 43 of the transmission together with the gears 48 or 49 mounted on it by means of bearings 52 or 53, the bearing 45 seated on the output shaft 42 and also the bearing plate 41. There is no need for further assembly work as regards the transmission parts belonging to the output shaft 42.

The contact surface 7, 27, 47 may be formed by an enlarged machined housing separating surface (FIG. 2).

It will also be apparent that needle bearings or other rolling elements can be provided in place of the balls of the bearings 5, 25, 45 and that the bearings used can also be more complex, i.e. provided with two or more circlets of rolling elements.

The bearing plate 1, 21, 41 may be produced in one single operation, i.e. by pressing or by some other form of non-cutting shaping.

The bearing plate 1, 21, 41 and bearing 5, 25, 45 together require very little space in axial direction. Accommodating the holding device for the bearing in the transmission is therefore not restricted to those parts which offer a lot of space in the transmission.

The bearing basis, i.e. the distance between the main bearing of the output 2, 22, 42 and the bearing 5, 25, 45 may therefore be very large, thus ensuring a low bearing load in the bearing 5, 25, 45.

Since the output shaft 42 is not mounted in the input shaft, the diameter of the input shaft is not a dominating factor and the bearing can be diminished more or less as liked.

We claim:

1. In a transmission having a housing, an output shaft journaled in an end of said housing and extending into said housing, and at least one gear on said output shaft in said housing, said output shaft having a free end beyond said gear, the improvement which comprises a bearing assembly in said housing, said bearing assembly including a rolling bearing on said shaft between said free end and said gear, a holding plate receiving and carrying said bearing, and means connecting said holding plate to said housing, said means including a shoulder formed on said housing and contacting one face of said plate whereby said plate is fixed and supported by said shoulder in one axial direction of said output shaft, and further including means for holding said plate against rotation relative to said shoulder whereby said plate is free from attachment to the housing in the opposite axial direction of the output shaft and said plate is free to move axially with said shaft relative to the housing in the said opposite axial direction.

2. The improvement defined in claim 1 wherein said means for holding includes a projection from said plate and a recess in a contacting surface of said housing against which said plate abuts in one axial direction, said recess receiving said projection.

3. The improvement defined in claim 2 wherein said holding plate is formed with an inwardly extending collar providing a contact surface for said bearing.

4. The improvement defined in claim 2, further comprising a split ring forming a contact surface for said bearing on said holding plate.

5. The improvement defined in claim 2 wherein said housing has a pair of interconnected housing parts, one of said parts having a separating face forming said surface.

6. The improvement defined in claim 5 wherein said separating face is enlarged.

7. The improvement defined in claim 5 wherein said separating face is machined.

8. The improvement defined in claim 2 wherein said plate is shaped without material removal.

9. The improvement defined in claim 1 wherein said means for holding includes a projection from said shoulder and an opening formed in said plate receiving said projection.

* * * * *